(12) United States Patent
Messere

(10) Patent No.: US 11,499,363 B2
(45) Date of Patent: Nov. 15, 2022

(54) INSULATING GLAZING HAVING AN ELECTRICAL CONNECTION ELEMENT

(71) Applicant: SAINT-GOBAIN GLASS FRANCE, Courbevoie (FR)

(72) Inventor: Rino Messere, Modave (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 330 days.

(21) Appl. No.: 16/643,149

(22) PCT Filed: Jul. 30, 2018

(86) PCT No.: PCT/EP2018/070585
§ 371 (c)(1),
(2) Date: Feb. 28, 2020

(87) PCT Pub. No.: WO2019/042679
PCT Pub. Date: Mar. 7, 2019

(65) Prior Publication Data
US 2020/0347668 A1    Nov. 5, 2020

(30) Foreign Application Priority Data
Aug. 30, 2017   (EP) .................................... 17188493

(51) Int. Cl.
*G02F 1/161*    (2006.01)
*E06B 3/67*    (2006.01)
(Continued)

(52) U.S. Cl.
CPC ...... *E06B 3/6722* (2013.01); *B32B 17/10513* (2013.01); *E06B 3/66328* (2013.01);
(Continued)

(58) Field of Classification Search
CPC ......... G02F 1/153; G02F 1/1533; G02F 1/161
See application file for complete search history.

(56) References Cited

U.S. PATENT DOCUMENTS

2017/0045795 A1*    2/2017  Brown .................. G02F 1/1533
2021/0191216 A1*    6/2021  Rozbicki ............... G02F 1/1345

FOREIGN PATENT DOCUMENTS

DE    20 2006 020 185 U1    2/2008
JP    S63-252949 A    10/1988
(Continued)

OTHER PUBLICATIONS

International Search Report as issued in International Patent Application No. PCT/EP2018/070585, dated Sep. 4, 2018.
(Continued)

*Primary Examiner* — Joseph P Martinez
(74) *Attorney, Agent, or Firm* — Pillsbury Winthrop Shaw Pittman LLP

(57) ABSTRACT

An insulating glazing includes a first pane having on an inner-side surface a coating and two busbars for contacting the coating, a second pane, a spacer, which extends peripherally around the first and second panes, two pane contact surfaces, a glazing interior surface, and an outer surface, wherein the first and second pane rest, respectively, against a first and a second pane contact surface of the spacer, an interior, which is enclosed between the first and the second pane, an outer interpane space adjacent the outer surface, in which an outer seal is inserted, and an electrical connection element for electrically contacting the coating having an outer and an inner end, whose outer end protrudes from the outer seal. The inner end of the connection element and one busbar are electrically connected and are arranged between the spacer and the first pane outside the interior formed peripherally by the spacer.

16 Claims, 3 Drawing Sheets

Figure 1:
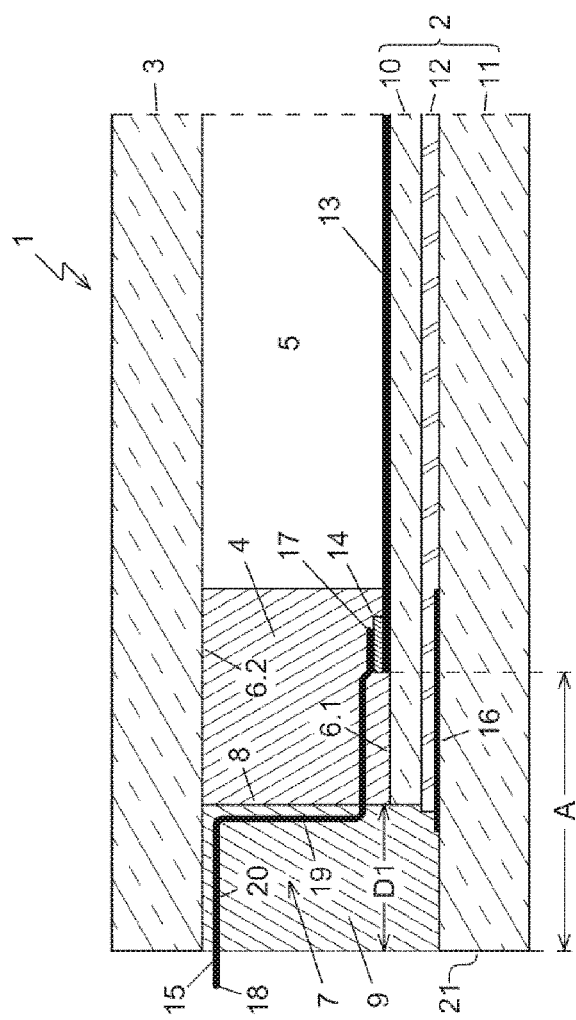

(51) Int. Cl.
  *B32B 17/10* (2006.01)
  *E06B 3/663* (2006.01)
  *E06B 9/24* (2006.01)
  *G02F 1/153* (2006.01)
  *H01R 25/14* (2006.01)

(52) U.S. Cl.
  CPC .............. *E06B 9/24* (2013.01); *G02F 1/1533* (2013.01); *G02F 1/161* (2013.01); *H01R 25/14* (2013.01); *B32B 2419/00* (2013.01); *E06B 2009/2464* (2013.01)

(56) References Cited

FOREIGN PATENT DOCUMENTS

| | | |
|---|---|---|
| JP | 2015-527279 A | 9/2015 |
| JP | 2017-077307 A | 4/2017 |
| KR | 10-2013-0026529 A | 3/2013 |
| KR | 10-2014-0031310 A | 3/2014 |
| WO | WO 2017/112685 A1 | 6/2017 |

OTHER PUBLICATIONS

Notice of Reasons for Refusal as issued in Japanese Patent Application No. 2020-512025, dated Mar. 2, 2022.
Notification of Reason for Refusal as issued in Korean Patent Application No. 10-2020-7005449, dated Jan. 17, 2022.

\* cited by examiner

INSULATING GLAZING HAVING AN ELECTRICAL CONNECTION ELEMENT

CROSS-REFERENCE TO RELATED APPLICATIONS

This application is the U.S. National Stage of PCT/EP2018/070585, filed Jul. 30, 2018, which in turn claims priority to European patent application number 17 188 493.5 filed Aug. 30, 2017. The content of these applications are incorporated herein by reference in their entireties.

The invention relates to an insulating glazing, a method for producing an insulating glazing, and a use of the insulating glazing.

Insulating glazings are increasingly frequently installed in glass façades on buildings for aesthetic reasons, especially when the façade is visually implemented as an all glass façade. Such an insulating glazing is made of at least two panes that are held at a distance from each other by a spacer. The panes can have a coating, in particular a heat and/or solar protection coating. Spacers made of materials with high thermal conductivity, for example, aluminum, have the disadvantage that they result in severe cooling of the pane edge with low external temperatures, which degrades the thermal insulation and can result in the formation of condensation water on the pane on the building-interior side. Consequently, spacers made of materials with lower thermal conductivity (so-called "warm edge" systems) are preferably used. Spacers made of polymeric materials have these improved thermal insulating properties. For example, dimensionally stable plastic profiles are known that contain desiccants in cavities or recesses or a desiccant-filled matrix. Often, these multicomponent spacers must be assembled in multiple individual process steps, making production costly.

The use of thermoplastic materials for producing spacers that are produced either as a prefabricated profile and subsequently fixed between the panes or extruded directly onto the pane is known. In the first case, the pane contact surfaces of the spacer must be provided with an adhesive in a separate production step. The material properties must be precisely coordinated with one another to prevent detachment of the spacer from the pane.

Injectable thermoplastic spacers (TPS spacers) made of sealing materials such as polyisobutylene and butyl rubber are known, which contain desiccants in the matrix, such that a step for filling hollow bodies in dimensionally stable spacers is eliminated. In addition, with these spacers, no separate sealing means or adhesive is required since the spacer itself is already made from an appropriate sealing material. These spacers can be applied directly on the pane. Thermoplastic spacers are also advantageous in terms of their comparatively high mechanical flexibility such that a different thermal expansion of the individual components of a glazing can be compensated. This is advantageous when using different pane materials of an insulating glazing.

The thermal insulating capacity of insulating glazing is significantly better than that of single plane glass and can be further improved in the case of triple glazing with special coatings. In particular, silver-containing coatings enable reduced transmittance of infrared radiation and thus reduce the temperature in the building interior. In addition to the important property of thermal insulation, functional as well as optical and aesthetic characteristics play an increasingly important role in the area of architectural glazing.

In particular in the case of buildings with an extensive glass exterior façade, the insulating effect plays an important role not merely for reasons of cost. Since the thermal insulating capacity of very thin glass is usually worse than masonry, improvements are necessary in this area.

In principle, each additional component increases the complexity of an insulating glazing. One problem in the production of such insulating glazings with functional coatings consists in electrically contacting the coating with a supply voltage. Electrical connection elements of the coating are routed outward from the sealed interior. In particular, all components running from inside the glazing into the external region of the insulating glazing usually degrade the insulating effect of the glazing. Above all, the necessary connection points can cause penetration of moisture into the insulating glazing. In addition, the inert gas, for example, nitrogen or argon, situated inside the insulating glazing can easily escape. Besides degradation of the insulating effect, the optical transparency and the overall impression of the insulating glazing are often degraded.

DE 20 2006 020 185 U1 discloses an insulating glazing unit in the form of a glass alarm pane. The glass alarm pane comprises a tempered pane that includes an electrically conducting structure in the edge region. The connection points of the conducting structure are positioned in the edge region of the insulating glazing, outside the insulating region. The edge region is preferably sealed with polysulfide. Such insulating glazing units have a very limited through-vision area.

WO 2017/112685 A1 discloses an arrangement of busbars in an insulating glazing unit with electrochromic properties. A busbar is embedded between an electrochromic layer and a spacer in a primary seal of the insulating glazing unit, in other words, the busbar is arranged sandwich-like between the substantially transparent substrate and the spacer. The embodiments described include busbars for electrochromic or other optical-state-changing devices. The busbars are intended to match the surroundings in terms of color. Such a busbar can also be transparent.

The object of the invention is to provide an insulating glazing in which the through-vision area is enlarged.

The object of the present invention is accomplished according to the invention by an insulating glazing in accordance with claim 1. Preferred embodiments are apparent from the dependent claims.

The insulating glazing according to the invention comprises a first pane, which has, on an inner-side surface at least partially, a coating as well as two busbars for contacting the coating, a second pane, a spacer that extends peripherally around the first and second pane and has a polymeric main body, two pane contact surfaces, a glazing interior surface, and an outer surface. Such spacers made of a sealing material are also referred to as thermoplastic spacers (TPS) and are distinguished by particularly long service life. The insulating glazing further comprises an interior enclosed between the first and the second pane, an outer interpane space adjacent the outer surface, in which an outer seal is inserted, and an electrical connection element for electrically contacting the coating, having an outer and an inner end, whose outer end protrudes from the outer seal. The first pane rests against a first pane contact surface of the spacer, and the second pane rests against a second pane contact surface of the spacer. The inner end of the connection element and one busbar are electrically connected, with this contacting arranged between the spacer and the first pane outside an interior formed peripherally by the spacer.

The advantages of this insulating glazing result from the combination according to the invention of a spacer made of a sealing material and a pane with a coating as well as their contacting outside the interior of the insulating glazing. As a result, the direct through-vision area, also referred to as the field of vision of the insulating glazing, can be greatly enlarged. The thermoplastic spacer has, in comparison to prior art rigid spacers, higher flexibility such that the different thermal expansion of adjacent materials can be compensated very well. This is particularly advantageous in combination with the use of a connection element for contacting a coating applied on the pane. Since the spacer is extruded directly into the interpane space, it can optimally adapt to the contour of the connection element, creating a very stable bond and, moreover, additional gluing of the components is unnecessary. Here, the connection element extends outward out of the spacer.

Advantageously, the insulating glazing has an opaque edge region, which is associated with the inner end of the connection element and the busbar and is provided for covering the inner end of the connection element as well as the busbar The contacting of the inner end of the connection element with the busbar occurs in the outer opaque edge region of the insulating glazing. The outer, opaque (non-transparent) edge region can include coloring, in particular black coloring, of the first pane and/or a peripheral pane frame in the edge region.

The outer, opaque edge region extends at the outer edge of the first pane preferably with a width of 10 mm to 35 mm, particularly preferably 13 mm. This is advantageous in terms of an improved direct through-vision region of the insulating glazing.

The panes of the insulating glazing are, in particular, insulating glass panes, composite panes, or single glass panes. A composite pane can include at least two panes that are joined to one another via an intermediate layer. The intermediate layer can preferably be a thermoplastic material such as polyvinyl butyral (PVB), ethylene vinyl acetate (EVA), polyurethane (PU), polyethylene terephthalate (PET), or multiple layers thereof, preferably with thicknesses of 0.3 mm to 0.9 mm. The interpane space can be filled with air or a gas, in particular a noble gas, such as argon or krypton.

In an advantageous embodiment of the insulating glazing according to the invention, the panes can be made of flat glass, float glass, soda lime glass, quartz glass, or borosilicate glass. The thickness of each pane can vary and thus be adapted to the requirements of the individual case. Preferably, panes with standard thicknesses from 4 mm to 19 mm and preferably from 3 mm to 19 mm are used. Preferably, at least one pane is implemented as textured glass.

The panes can be colorless or colored and/or have a coating, in particular a transparent and/or electrically conductive coating or at least an electrically switchable coating. Such a coating can function as lighting, heating, or an antenna or be used in an electrically switchable glazing, such as displays or electrochromic glazing.

The electrochromic glazing includes at least two electrode layers and two electrochemically active layers situated between the two electrode layers, which are separated from one another by an electrolyte layer. The two active layers are in each case capable of reversibly storing small ions, with at least one of the two layers made of an electrochromic material that has different oxidation states that correspond to the stored or released state of the ions and have a different coloration. Through application of electrical voltages of different polarity, the storing or releasing of the ions can be controlled in order to selectively influence the optical transmittance of the coating.

In an advantageous further development of the insulating glazing according to the invention, the first pane has an electrically conductive coating that is transparent. The transparent, electrically conductive coating can be permeable to electromagnetic radiation, preferably electromagnetic radiation of a wavelength from 300 to 1300 nm, in particular for visible light from 390 nm to 780 nm. "Permeable" means that the total transmittance of the pane is, in particular for visible light, preferably >70% and in particular >75%.

The transparent, electrically conductive coating is preferably a functional coating, particularly preferably a functional coating with solar protection. A coating with solar protection has reflecting properties in the infrared range and, thus, in the range of sunlight. The transparent, electrically conductive coating can have particularly low emissivities (low-E). As a result, heating of the interior of the building due to sunlight is advantageously reduced.

Such coatings are known to the person skilled in the art and typically include at least one metal, in particular silver or a silver-containing alloy. The transparent, electrically conductive coating can include a sequence of multiple individual layers, in particular at least one metallic layer and dielectric layers that contain, for example, at least one metal oxide. The metal oxide preferably contains zinc oxide, tin oxide, indium oxide, titanium oxide, silicon oxide, aluminum oxide, or the like, as well as combinations of one or more thereof. The dielectric material can also contain silicon nitride, silicon carbide, or aluminum nitride.

This layer structure is generally obtained by a sequence of deposition operations that is carried out by a vacuum method such as magnetic field enhanced cathodic sputtering. Very fine metal layers, which contain, in particular, titanium or niobium, can also be provided on both sides of the silver layer. The lower metal layer serves as an adhesion and crystallization layer. The upper metal layer serves as a protective and getter layer to prevent modification of the silver during the further process steps.

Particularly suitable transparent, electrically conductive coatings contain at least one metal, preferably silver, nickel, chromium, niobium, tin, titanium, copper, palladium, zinc, gold, cadmium, aluminum, silicon, tungsten, or alloys thereof, and/or at least one metal oxide layer, preferably tin-doped indium oxide (ITO), aluminum-doped zinc oxide (AZO), fluorine-doped tin oxide (FTO, $SnO_2$:F), antimony-doped tin oxide (ATO, $SnO_2$:Sb), and/or carbon nanotubes and/or optically transparent, electrically conductive polymers, preferably poly(3,4-ethylene dioxythiophenes), polystyrene sulfonate, poly(4,4-dioctyl-cylopentadithiophene), 2,3-dichloro-5,6-dicyano-1,4-benzoquinone, mixtures, and/or copolymers thereof.

The thickness of the transparent, electrically conductive coating can vary widely and be adapted to the requirements of the individual case. In the context of the invention, "thickness of the transparent, electrically conductive coating" means a mean dimension perpendicular to the surface of the first pane. It is essential here that the thickness of the transparent, electrically conductive coating not be so great that it becomes nontransparent to electromagnetic radiation, preferably electromagnetic radiation of a wavelength from 300 nm to 1300 nm (nanometers) and in particular visible light from 390 nm to 780 nm. The transparent, electrically conductive coating preferably has a layer thickness of 10 nm (nanometers) to 5 µm (microns) and particularly preferably of 30 nm to 1 µm.

The sheet resistance of the transparent, electrically conductive coating is preferably from 0.35 ohm/square to 200 ohm/square, preferably 0.5 ohm/square to 200 ohm/square, most particularly preferably from 0.6 ohm/square to 30 ohm/square, and in particular from 2 ohm/square to 20 ohm/square. The transparent, electrically conductive coating can, in principle, have even lower sheet resistances than 0.35 ohm/square, in particular if, during their use, only a low light transmittance is required.

In an advantageous embodiment of the insulating glazing according to the invention, the electrically conductive coating is arranged on at least 70%, preferably 80% to 100%, and particularly preferably 98% to 100% of the through-vision area of the first pane. The through-vision area is the area of the first pane in which through-vision is not prevented by the opaque edge region, the frame, spacers, or other attachment components.

In an advantageous further development of the insulating glazing according to the invention, the connection element comprises an electrical component, in particular a cable and/or a flexible printed circuit board with at least one electrical component. The cable, in particular a flat cable or a round cable, can have one or a plurality of conductors. Flexible printed circuit boards usually have a flexible plastic carrier, for example, polyester film, polyimide, Mylar, or nylon, which is printed with an electronic circuit.

The inner end of the connection element preferably contacts the busbar at a distance of 10 mm to 13 mm from the outer edge of the insulating glazing.

The spacer preferably has a height of approx. 9 mm.

Preferably, the outer seal is situated in the outer interpane space adjacent the spacer. The outer seal can be used both in combination with a primary sealing means and also directly adjacent the main body of the spacer. The outer seal fills the outer interpane space in its entire width between the first pane and the second pane. The outer seal effects bonding of the first and the second pane and thus ensures sufficient mechanical stability of the insulating glazing. The outer seal preferably contains a polymer or a silane-modified polymer, particularly preferably organic polysulfides, silicones, room-temperature-vulcanizing silicone rubber, high-temperature-vulcanizing silicone rubber, peroxide-vulcanizing silicone rubber, and/or addition-vulcanizing silicone rubber, polyurethanes, and/or butyl rubber. Such materials have very good adhesion to glass such that the outer seal serves above all for bonding of the panes and contributes to the mechanical stability of the insulating glazing. In an optional embodiment, additives to increase aging resistance, for example, UV stabilizers can also be included.

The first pane or the second pane can be joined via an additional spacer to an additional third pane and thus form an insulating glazing with triple glazing.

The invention further includes a method for producing the insulating glazing according to the invention. In a first step of the method according to the invention, a coating is electrically contacted with a connection element, wherein the coating is applied on an inner-side surface of a first pane. Then, a spacer comprising a polymeric main body is extruded into an intermediate space between the first pane and the second pane. The spacer is mounted, in each case via a pane contact surface, between the first pane and a second pane. Subsequently, the assembly is pressed and an outer seal is inserted into the outer interpane space.

Preferably, the inner interpane space of the pane assembly is filled with a protective gas.

Another aspect of the invention includes the use of an insulating glazing according to the invention as building interior glazing, building exterior glazing, and/or façade glazing.

The invention is explained in detail in the following with reference to drawings and exemplary embodiments. Drawings are a schematic representation and not to scale.

The drawings in no way restrict the invention.

Figure 2:
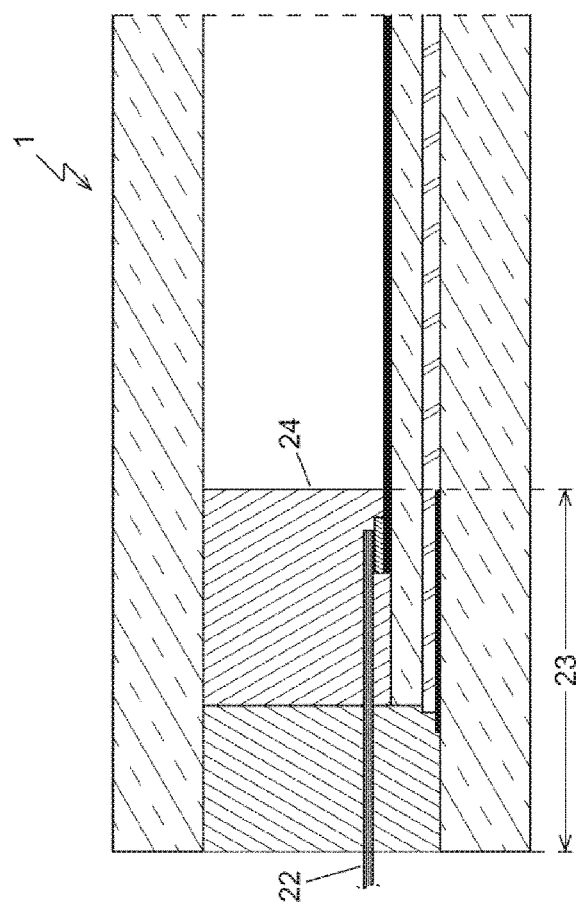
Figure 3:
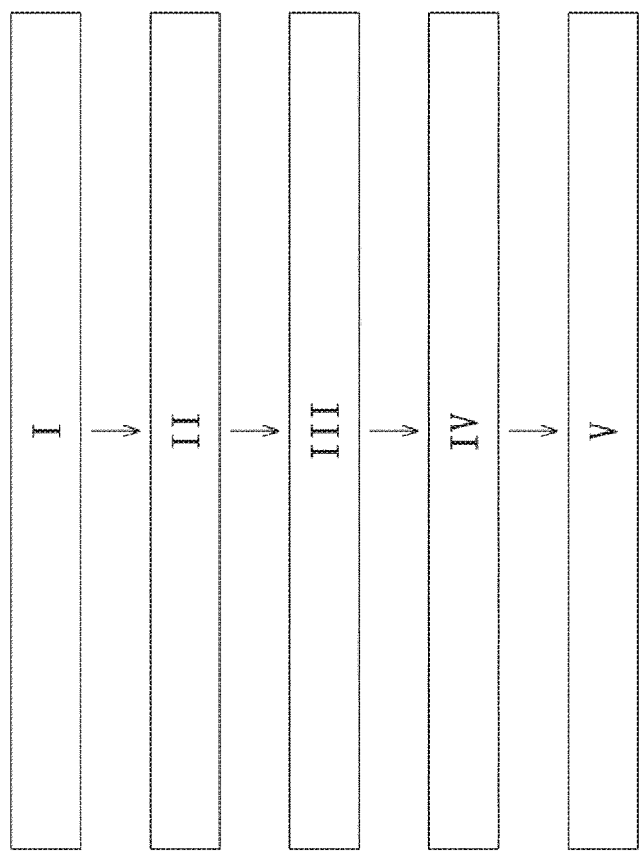

They depict:

FIG. 1 a cross-sectional representation of an insulating glazing according to the invention with a connection element, FIG. 2 another embodiment of the insulating glazing according to the invention with a connection element, and FIG. 3 a flowchart of an embodiment of the method according to the invention for producing an insulating glazing.

FIG. 1 depicts a representation of an insulating glazing 1 according to the invention in cross-section. The insulating glazing 1 comprises two panes 2 and 3 that are joined via a spacer 4. The spacer 4 is mounted between the first pane 2 and the second pane 3 arranged parallel thereto. The spacer 4 has a height of approx. 9 mm. The spacer 4 further has a main body, to which an inner interior 5 is adjacent. The interior 5 adjacent the spacer 4 is defined as the space delimited by the first pane 2 and the second pane 3. The interior 5 has a through-vision area and, thus, forms a particularly wide direct field of vision of the insulating glazing 1. The first pane 2 is adjacent a first pane contact surface 6.1 and the second pane 3 is adjacent the second pane contact surface 6.2.

An outer interpane space 7 is delimited by the first pane 2, the second pane 3, and an outer surface 8 of the spacer 4. A seal 9, also referred to as a secondary sealing means, is situated in the outer interpane space 7 adjacent the outer surface 8 of the spacer 4. The seal 9 contains substantially silicone. The seal 9 can also contain additives to increase aging resistance, for example, UV stabilizers.

The second pane 3 is a glass pane made of soda lime glass with a thickness of 4 mm. The first pane 2 is implemented as a composite pane. The first pane 2 is provided for separating an exterior space from an interior of a building. The first pane 2 comprises two glass panes 10 and 11 made of soda lime glass with different thicknesses. A thin glass pane 10 with a thickness of 2.2 mm (millimeters) is bonded to a thick glass pane 11 via a laminating film 12 made of polyvinyl butyral with a thickness of 0.76 mm. The laminating film 12 can also contain a thermoplastic material, such as polyvinyl butyral (PVB), ethylene vinyl acetate (EVA), polyurethane (PU), polyethylene terephthalate (PET), or multiple layers thereof.

The thick glass pane 11 has a thickness of approx. 4 mm. The outer side of the thick glass pane 11 points outward, whereas the inner side of the thick glass pane 11 is bonded via the laminating film 12 to the outer side of the thin glass pane 10. In the context of the invention, "inner side" refers to the side of the glass panes facing the interior 5. "Outer side" refers to the side of the pane facing the external environment. An opaquely colored edge region 16 is situated between the laminating film 12 and the thick glass pane 11. The thick glass pane 11 and the thin glass pane 10 with the laminating film 12 are not implemented flush at the edge. The thin glass pane 10 with the laminating film 12 can be arranged offset from the pane edge of the thick glass pane 11 by a distance of approx. 8 mm, which corresponds to a thickness D1 of the seal 9.

The thin glass pane 10 has an electrically conductive coating 13 on the inner-side surface. The electrically conductive coating 13 is transparent. The electrically conductive coating 13 extends almost completely over the inner-side surface of the thin glass pane 10, minus an edge de-coating with a width of, for example, 10 mm (millimeters) from the pane edge of the thick glass pane 11. The electrically conductive coating 13 is connected via the busbar 14 and the connection element 15 to a voltage source. The connection element 15 has an inner end 17 and an outer end 18. The inner end 17 of the connection element 15 is provided for contacting with a busbar 14, whereas the outer end 18 of the connection element 15 is connected to a voltage source (not shown).

The electrically conductive coating 13 was deposited by means of magnetron sputtering onto the inner-side surface of the thin glass pane 10. The electrically conductive coating 13 comprises three conductive silver layers with dielectric layers arranged therebetween and has sheet resistance of 0.9 Ω/square.

The busbar 14 was produced by printing a conductive paste and contacted on the electrically conductive coating 13. The conductive paste contains silver particles and glass frits. The layer thickness of the fired conductive paste is approx. 5 µm to 20 µm (microns). Alternatively, thin and narrow metal foil strips or metal wires that contain copper or aluminum are also used as the busbar 14. The busbar 14 runs in the edge region at a distance A from the pane edge of the thick glass pane 11, parallel to a side edge of the thin glass pane 10. The distance A of the busbar 14 from the pane edge of the thick glass pane 11 is, for example, 10 mm.

The electrical contact between the electrically conductive coating 13 and the busbar 14 as well as between the busbar 14 and the connection element 15 was established by soldering or gluing with an electrically conductive adhesive. The busbar 14 and the contacting with the inner end of the connection element 15 are situated at the level of the opaquely colored edge region 16 such that they are not visible from the outside. The opaquely colored edge region 16 is approx. 10 mm wide and, thus, completely covers the busbar 14.

The connection element 15 consists of a flexible cable, also referred to as flat cable or ribbon cable. The cable can be T-shaped and have, on its two side arms, two metallic contacting services, which are provided for contacting with the busbar 14. The side arms of the T-shaped cable form the inner end of the connection element 15. The busbar 14 completely covers the contacting surfaces of the T-shaped cable. The inner end of the connection element 15 contacts the busbar 14 preferably at a distance of approx. 10 mm from the outer edge 21 of the insulating glazing 1. The connection element 15 runs all the way to where it leaves the main body of the spacer 4 parallel to the first pane 2. In the seal 9, the connection element 15 runs in a first section 19 transverse to the longitudinal direction of the spacer 4. In the second section 20, the connection element 15 runs parallel to the second pane 3 and emerges from the seal 9 on the outer edge 21 of the insulating glazing 1.

Alternatively, the connection element 15 can run parallel to the longitudinal axis of the spacer 4 and protrude at a lateral edge of the insulating glazing 1.

Furthermore, the insulating glazing 1 can include sealing means that are provided to seal the insulating glazing 1 against moisture. Gas tightness is also essentially important for the insulating glazing 1, especially when the interior 5 of the insulating glazing 1 is filled with a thermal insulating gas, e.g., argon.

FIG. 2 depicts another embodiment of the insulating glazing 1 according to the invention. The insulating glazing 1 of FIG. 2 is constructed almost identically. In contrast to the insulating glazing 1 of FIG. 1, the connection element 15 of FIG. 2 is implemented as a flexible printed circuit board 22. The flexible printed circuit board 22 has an inner end and an outer end opposite the inner end. At its inner end, the flexible printed circuit board 22 electrically contacts the busbar 14. In addition, the insulating glazing 1 in FIG. 2 has an outer peripheral frame 22 instead of the opaquely colored edge region 16. The frame 22 is arranged on the outer side of the thick pane 11 and covers both the busbar 14 and the contacting between the busbar 14 and the inner end of the printed circuit board 22.

The arrangement of the contacting between the busbar 14 and the inner end of the printed circuit board 22 between the spacer 4 and the first pane 2 ensures that the contacting is not visible from the outside. As a result, the through-vision area of the insulating glazing 1 is changed, accompanied by optimization of the direct field of vision of the insulating glazing 1.

It is understood that the invention is not limited to a flexible cable or a printed circuit board as a connection element 15.

FIG. 5 depicts a flowchart of a possible embodiment of the method according to the invention for producing an insulating glazing 1, comprising the steps I to V:

Step I: Electrically contacting a coating 13 with a connection element 15, wherein the coating 13 is arranged on an inner-side surface of a first pane 2, Step II: Extruding a spacer 4 comprising a polymeric main body on the first pane 2 such that the spacer 4 surrounds an outer end 17 of the connection element 15, Step III: Arranging the second pane 3 on the spacer 4 such that the spacer 4 is arranged, via a pane contact surface 6.1, 6.2 in each case, between the first pane 2 and the second pane 3, Step IV: Pressing the assembly comprising the first pane 2, the second pane 3, and the spacer 4 together, and Step V: Filling the outer interpane space 7 with an outer seal seal 9.

In the pressing step, the first pane 2 and the second pane 3 are in each case pressed circumferentially against the first or the second contact surfaces 6.1, 6.2 of the spacer 4 on all four edges of the panes 2, 3. This produces the firmly bonded insulating glazing 1 comprising the panes 2, 3 and the spacer 4.

In addition, the interior 5 of the insulating glazing can be fil's led with a protective gas.

LIST OF REFERENCE CHARACTERS 1 insulating glazing
2 first pane
3 second pane
4 spacer
5 interior
6.1 first pane contact surface
6.2 second pane contact surface
7 outer interpane space
8 outer surface
9 seal
10 thin glass pane
11 thick glass pane
12 laminating film
13 electrically conductive coating
14 busbar
15 connection element
16 opaquely colored edge region
17 inner end of the connection element
18 outer end of the connection element
19 first section of the connection element
20 second section of the connection element
21 outer edge of the insulating glazing 1

22 printed circuit board
23 frame
24 glazing interior surface
D1 thickness of the seal 9
A distance between the pane edge of the thick pane 11 and busbar 14

The invention claimed is:

1. An insulating glazing comprising:
a first pane, which has, on an inner-side surface at least partially, a coating as well as two busbars for contacting the coating,
a second pane,
a thermoplastic spacer, which extends peripherally around the first and second panes and which has a polymeric main body, two pane contact surfaces, a glazing interior surface, and an outer surface, wherein the first pane rests against a first pane contact surface of the spacer in direct contact with the first pane contact surface and the second pane rests against a second pane contact surface of the spacer in direct contact with the second pane contact surface,
an interior, which is enclosed between the first and the second pane,
an outer interpane space adjacent the outer surface, in which an outer seal is inserted,
and an electrical connection element for electrically contacting the coating having an outer and an inner end, whose outer end protrudes from the outer seal,
wherein the inner end of the connection element and one busbar are electrically connected and are arranged between the spacer and the first pane outside the interior formed peripherally by the spacer,
the thermoplastic spacer being directly extruded on the electrical connection element such that the thermoplastic spacer surrounds the inner end of the connection element.

2. The insulating glazing according to claim 1, wherein an opaque edge region is associated with the inner end of the connection element and the busbar and is provided for covering the inner end of the connection element as well as the busbar.

3. The insulating glazing according to claim 1, wherein the connection element is an electrical component.

4. The insulating glazing according to claim 1, wherein the connection element is routed laterally out of the insulating glazing.

5. The insulating glazing according to claim 2, wherein the outer opaque edge region extends at an outer edge of the first pane with a width of 10 mm to 35 mm.

6. The insulating glazing according to claim 1, wherein the inner end of the connection element contacts the busbar at a distance of 10 mm to 13 mm from an outer edge of the insulating glazing.

7. The insulating glazing according to claim 1, wherein the thickness of the first and/or second pane is 4 mm to 19 mm.

8. The insulating glazing according to claim 1, wherein the spacer has a height of approximately 9 mm.

9. The insulating glazing according to claim 1, wherein the coating is electrically conductive or at least electrically switchable.

10. The insulating glazing according to claim 1, wherein the coating is transparent.

11. The insulating glazing according to claim 1, wherein the outer seal contains polysulfides, silicones, silicone rubber, polyurethanes, polyacrylates, copolymers and/or mixtures thereof.

12. The insulating glazing according to claim 1, wherein the first pane is a composite pane.

13. The insulating glazing according to claim 1, wherein the first and/or second pane is/are designed as textured glass.

14. A method for producing an insulating glazing according to claim 1, comprising
a) electrically contacting a coating with a connection element, wherein the coating is applied on an inner-side surface of a first pane,
b) extruding a spacer comprising a polymeric main body on the first pane such that the spacer surrounds an inner end of the connection element,
c) mounting a second pane on the spacer such that the spacer is arranged, via a pane contact surface in each case, between the first pane and the second pane to form an assembly,
d) pressing the assembly, and
e) inserting an outer seal into the outer interpane space.

15. A method comprising utilizing an insulating glazing according to claim 1 as building interior glazing, building exterior glazing, and/or façade glazing.

16. The insulating glazing according to claim 3, wherein the connection element is a cable and/or a flexible printed circuit board with at least one electrical component.

* * * * *